(12) United States Patent
Taniguchi et al.

(10) Patent No.: US 12,139,090 B2
(45) Date of Patent: Nov. 12, 2024

(54) INSTRUMENT PANEL STRUCTURE WITH KNEE AIRBAG

(71) Applicant: HONDA MOTOR CO., LTD., Tokyo (JP)

(72) Inventors: Hiroyasu Taniguchi, Tokyo (JP); Takuto Okada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/072,751

(22) Filed: Dec. 1, 2022

(65) Prior Publication Data

US 2023/0182672 A1 Jun. 15, 2023

(30) Foreign Application Priority Data

Dec. 15, 2021 (JP) ................................. 2021-203381

(51) Int. Cl.
*B60R 21/206* (2011.01)
*B60R 21/205* (2011.01)

(52) U.S. Cl.
CPC .......... *B60R 21/206* (2013.01); *B60R 21/205* (2013.01)

(58) Field of Classification Search
CPC ............................. B60R 21/206; B60R 21/205
See application file for complete search history.

(56) References Cited

U.S. PATENT DOCUMENTS

| | | | | |
|---|---|---|---|---|
| 5,755,460 A | * | 5/1998 | Barnes ................ | B60R 21/2165 180/90 |
| 7,370,879 B2 | * | 5/2008 | Hotta ................. | B60R 21/2171 280/732 |
| 8,096,575 B2 | * | 1/2012 | Voyer ..................... | B62D 65/14 280/728.2 |
| 11,351,945 B1 | * | 6/2022 | Thomas .............. | B60R 21/2165 |
| 2004/0075253 A1 | * | 4/2004 | Morita .................. | B60R 21/045 280/730.1 |
| 2004/0124617 A1 | * | 7/2004 | Morita ................ | B60R 21/2165 280/751 |
| 2005/0082794 A1 | * | 4/2005 | Geyer ................. | B60R 21/2171 280/728.2 |

(Continued)

FOREIGN PATENT DOCUMENTS

DE 202019103440 7/2019
FR 3119810 A1 * 8/2022

(Continued)

OTHER PUBLICATIONS

Japanese Office Action for Japanese Patent Application No. 2021-203381 mailed Jun. 11, 2024.

*Primary Examiner* — Barry Gooden, Jr.

(74) *Attorney, Agent, or Firm* — Amin, Turocy & Watson, LLP

(57) ABSTRACT

An instrument panel structure with a knee airbag includes a knee airbag module and a cover member. The cover member is attached to an instrument panel lower part and includes a main body portion and a lock portion. A center lower cover of the instrument panel lower part includes an opening portion and a notch portion. The opening portion is formed such that a leg section of the main body portion and the lock portion are inserted in the opening portion. The notch portion is formed so as to allow entry of the leg section and prevent the lock portion from exiting.

11 Claims, 13 Drawing Sheets

(56) References Cited

U.S. PATENT DOCUMENTS

| | | | | |
|---|---|---|---|---|
| 2005/0140123 A1* | 6/2005 | Hotta | ........................ | B60R 21/26 |
| | | | | 280/736 |
| 2008/0174091 A1* | 7/2008 | Hoshino | ............... | B60R 21/206 |
| | | | | 280/728.3 |
| 2010/0117342 A1* | 5/2010 | Kim | .................... | B60R 21/2334 |
| | | | | 280/730.1 |
| 2011/0109064 A1* | 5/2011 | Best | ......................... | B60R 21/02 |
| | | | | 280/728.2 |
| 2015/0091276 A1* | 4/2015 | Ando | .................... | B60R 21/206 |
| | | | | 280/728.3 |
| 2016/0167614 A1* | 6/2016 | Inami | .................... | B60R 21/216 |
| | | | | 280/730.2 |
| 2017/0088081 A1* | 3/2017 | Kojima | ............... | B60R 21/2171 |
| 2017/0253195 A1* | 9/2017 | Yamamoto | .......... | B60R 13/0206 |
| 2018/0272982 A1* | 9/2018 | Yamauchi | ............. | B60R 21/206 |
| 2018/0281735 A1* | 10/2018 | Shigemura | ............ | B60R 21/237 |
| 2020/0339059 A1* | 10/2020 | Kobayashi | ............ | B60R 21/206 |
| 2022/0136539 A1* | 5/2022 | Longo | ................. | B60R 13/0275 |
| | | | | 52/586.2 |

FOREIGN PATENT DOCUMENTS

| | | | | | |
|---|---|---|---|---|---|
| JP | 2003205816 A | * | 7/2003 | ........... | B60R 21/203 |
| JP | 2003312432 A | * | 11/2003 | ........... | B60R 21/203 |
| JP | 2004-098867 | | 4/2004 | | |
| JP | 2004098892 A | * | 4/2004 | ........... | B60R 21/203 |
| JP | 2005199766 A | * | 7/2005 | ........... | B60R 21/203 |
| JP | 2008-055937 | | 3/2008 | | |
| JP | 2015-098293 | | 5/2015 | | |
| JP | 2016-043835 | | 4/2016 | | |
| KR | 20040097653 A | * | 11/2004 | | |
| KR | 10-2009-0110425 | | 10/2019 | | |
| WO | WO-2019235477 A1 | * | 12/2019 | | |

* cited by examiner

INSTRUMENT PANEL STRUCTURE WITH KNEE AIRBAG

CROSS-REFERENCE TO RELATED APPLICATION

Priority is claimed on Japanese Patent Application No. 2021-203381, filed on Dec. 15, 2021, the contents of which are incorporated herein by reference.

BACKGROUND

Field of the Invention

The present invention relates to an instrument panel structure with a knee airbag.

Background

For example, a technique is disclosed in which a knee airbag is attached to an instrument panel lower part, and a cover member is attached to the instrument panel lower part in the vicinity of the knee airbag. The cover member is attached to, for example, the instrument panel lower part. As a related art, for example, a technique described in Japanese Unexamined Patent Application, First Publication No. 2004-98867 is known.

SUMMARY

Here, in the related art described above, the cover member is attached to the instrument panel. Therefore, it is conceivable that when the knee airbag is expanded, for example, the cover member is removed from the instrument panel and is loosed due to an expansion force of the knee airbag.

As a measure for this, for example, it is conceivable that the instrument panel lower part and the cover member are mechanically fastened by a fastening member such as a bolt. However, when the instrument panel lower part and the cover member are mechanically fastened by a fastening member such as a bolt, the number of components is increased, which prevents the cost from being reduced and prevents the weight from being reduced.

Further, portions in the instrument panel lower part and the cover member that are fastened by the fastening member such as a bolt are required, thus increasing the size of the component. Further, it is necessary to add a step of fastening the cover member to the instrument panel lower part by the fastening member such as a bolt, which prevents the assembly workability from being simplified.

An aspect of the present invention is intended to provide an instrument panel structure with a knee airbag capable of preventing a cover member from being loosed at the time of expansion of the knee airbag without mechanically fastening the cover member to an instrument panel lower part.

An instrument panel structure with a knee airbag of a vehicle according to a first aspect of the present invention includes: a knee airbag that is arranged on an instrument panel lower part; and a cover member that is arranged above the knee airbag and is attached to the instrument panel lower part, wherein the cover member includes: a main body portion that extends in a vehicle body forward direction from a rear surface of the cover member; and a lock portion that is provided on a front end of the main body portion, and wherein the instrument panel lower part includes: an opening portion in which the main body portion and the lock portion are inserted; and a notch portion that extends upward from the opening portion, the notch portion being formed so as to allow entry of the main body portion and prevent the lock portion from exiting in a state where the main body portion enters the notch portion.

In this configuration, the cover member includes the main body portion and the lock portion, and the instrument panel lower part includes the opening portion. The opening portion is formed such that the main body portion and the lock portion are inserted in the opening portion. Therefore, the cover member can be attached to the instrument panel lower part by inserting the main body portion and the lock portion that are included in the cover member into the opening portion.

Further, the instrument panel lower part includes the notch portion, and the notch portion extends upward from the opening portion. The notch portion is formed so as to allow entry of the main body portion and prevent the lock portion from exiting in a state where the main body portion enters the notch portion. Therefore, when the cover member moves upward due to an expansion force of the knee airbag, the main body portion can enter (be inserted into) the notch portion in accordance with the movement of the cover member. In this state, the notch portion prevents the lock portion from exiting to a vehicle room side, and thereby, it is possible to prevent the cover member from being loosed.

Thereby, for example, it is possible to prevent the cover member from being loosed at the time of expansion of the knee airbag without mechanically fastening the cover member to the instrument panel lower part by a fastening member such as a bolt. Accordingly, it is possible to make the fastening member such as a bolt unnecessary, and it is possible to reduce the number of components and reduce the cost.

Further, it is possible to make portions in the instrument panel lower part and the cover member that are fastened by the fastening member unnecessary, and it is possible prevent the size of the component from increasing. Further, it is possible to make a step of fastening the cover member to the instrument panel lower part by the fastening member unnecessary, and it is possible to simplify the assembly workability.

In a second aspect, the cover member may include a plurality of claw portions that are provided above and below the main body portion, and the cover member may be attached to the instrument panel lower part by the plurality of claw portions.

In this configuration, the cover member includes the plurality of claw portions, and the plurality of claw portions are provided above and below the main body portion. Further, the cover member is attached to the instrument panel lower part by the plurality of claw portions. Therefore, when the cover member moves upward due to the expansion force of the knee airbag, it is possible to prevent the cover member (that is, the main body portion) from moving in a vehicle width direction by the plurality of claw portions. Thereby, it is possible to cause the main body portion to favorably enter the notch portion in accordance with the movement of the cover member.

In a third aspect, the cover member may include a regulation portion that is provided on a side portion of the cover member and on an inside in a vehicle width direction of the main body portion, and the regulation portion may be formed to be capable of coming into contact with the instrument panel lower part in the vehicle width direction.

In this configuration, the regulation portion is provided on the cover member, and the regulation portion is formed to be capable of coming into contact with the instrument panel lower part in the vehicle width direction. Therefore, when the cover member moves upward due to the expansion force of the knee airbag, by causing the regulation portion to come into contact with the instrument panel lower part, it is possible to prevent the cover member (that is, the main body portion) from moving in the vehicle width direction. Thereby, it is possible to cause the main body portion to favorably enter the notch portion in accordance with the movement of the cover member.

In a fourth aspect, the main body portion may include a support section that is provided on the rear surface of the cover member and extends in an opposite direction with respect to a protrusion direction of the lock portion.

Here, in a state where the cover member moves upward due to the expansion force of the knee airbag, and the main body portion enters the notch portion, the lock portion comes into contact with the instrument panel lower part and prevents the cover member from being loosed. At this time, it is conceivable that a tensile force due to the expansion force of the knee airbag acts on the main body portion, a stress concentrates on a connection portion between the main body portion and the cover member, and a crack or the like is generated at the connection portion.

Therefore, there is a possibility that the main body portion and lock portion cannot hold the cover member to the instrument panel lower part.

Accordingly, in this configuration, the main body portion includes the support section, and the support section is provided on the rear surface of the cover member. Thereby, when the tensile force due to the expansion force of the knee airbag acts on the main body portion, the support section can prevent the stress from concentrating on the connection portion between the main body portion and the cover member. That is, it is possible to prevent a crack or the like from being generated at the connection portion between the main body portion and the cover member. Accordingly, the main body portion and the lock portion can hold the cover member such that the cover member is not loosed from the instrument panel lower part.

Here, in a state where the lock portion is in contact with the instrument panel lower part, the expansion force of the knee airbag acts on the lock portion. In this state, it is conceivable that the main body portion deforms in a curved shape to an opposite side with respect to a protrusion direction of the lock portion due to the expansion force of the knee airbag.

Accordingly, in this configuration, the support section extends in the opposite direction with respect to the protrusion direction of the lock portion. Therefore, when the tensile force due to the expansion force of the knee airbag acts on the main body portion, the support section can further efficiently prevent the stress from concentrating on the connection portion between the main body portion and the cover member. That is, it is possible to further favorably prevent a crack or the like from being generated at the connection portion between the main body portion and the cover member. Thereby, the cover member can be further favorably held by the main body portion and the lock portion so as not to be loosed from the instrument panel lower part.

According to an aspect of the present invention, it is possible to prevent the cover member from being loosed at the time of expansion of the knee airbag without mechanically fastening the cover member to the instrument panel lower part.

DESCRIPTION OF EMBODIMENTS

Figure 1:
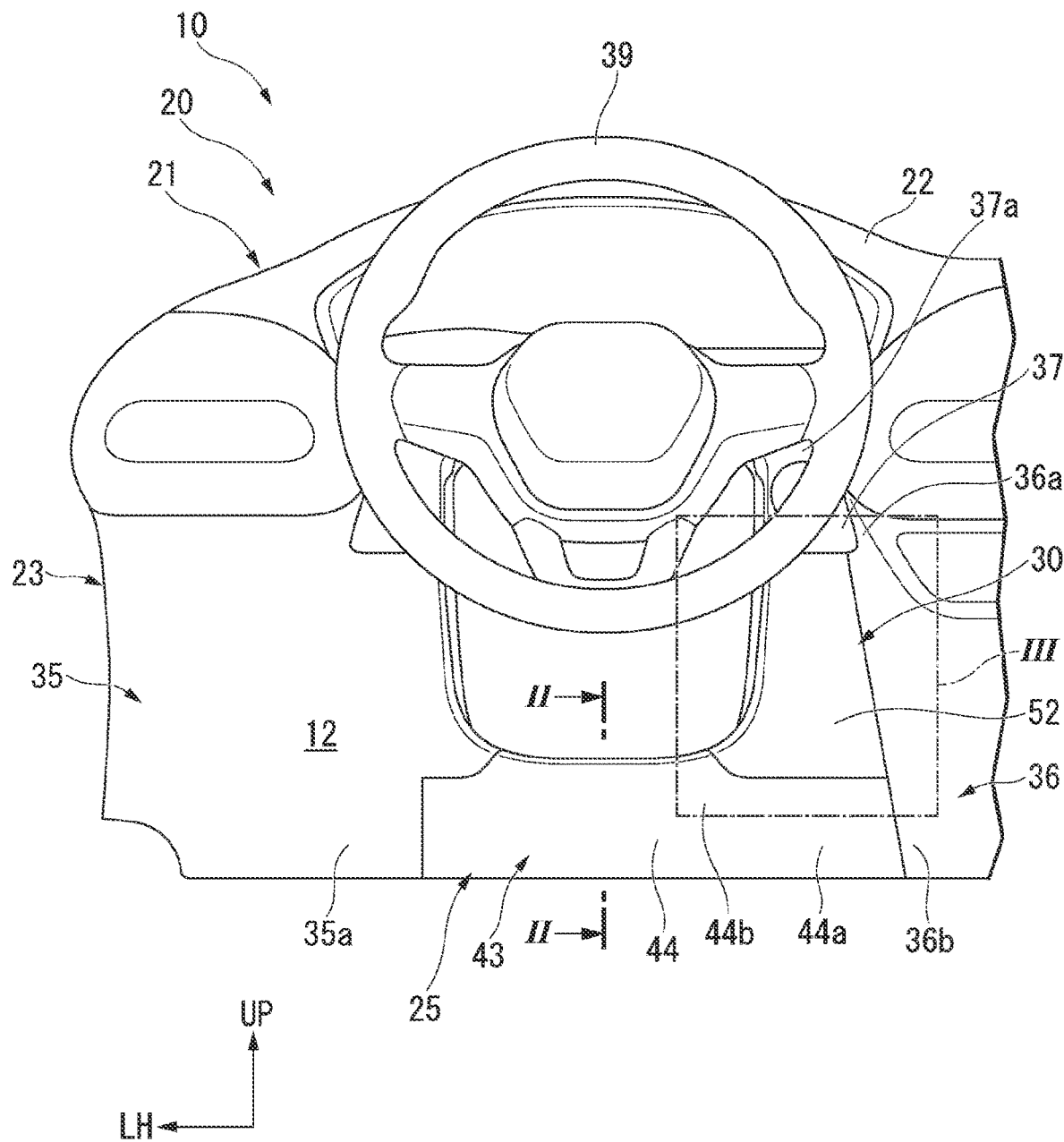
FIG. 1 is a front view of an instrument panel structure with a knee airbag according to an embodiment of the present invention when seen from a vehicle room side.

Hereinafter, an instrument panel structure with a knee airbag according to an embodiment of the present invention will be described with reference to the drawings. In the drawings, an arrow FR indicates a forward direction of a vehicle, an arrow UP indicates an upward direction of the vehicle, and an arrow LH indicates a leftward direction of the vehicle. In the following description, an instrument panel structure with a knee airbag 20 is referred to as an "instrument panel structure 20".

<Vehicle>

FIG. 1 is a perspective view of a vehicle 10 that includes the instrument panel structure 20 when seen from a vehicle room 12 side.

As shown in FIG. 1, for example, the instrument panel structure 20 is provided on the vehicle 10 in a vehicle body forward portion of the vehicle room 12. The instrument panel structure 20 includes an instrument panel 21, a knee airbag module (knee airbag) 25 that is arranged on the instrument panel 21, and a cover member 30 that is arranged on the knee airbag module 25.

<Instrument Panel>

The instrument panel 21 includes: an instrument panel upper part 22 that forms an upper part of the instrument panel 21 and is made of a resin; and an instrument panel lower part 23 that forms a lower part of the instrument panel 21 and is made of a resin.

The instrument panel lower part 23 includes: an instrument panel lower main body 35; a center lower cover 36 that is made of a resin and is attached to the instrument panel lower main body 35 at a middle in a vehicle width direction; and a meter visor 37 that is made of a resin and is attached to an upper left portion 36a of the center lower cover 36. An upper end 37a of the meter visor 37 is attached to a middle portion in the vehicle width direction of the instrument panel lower main body 35.

Here, the center lower cover 36 includes an opening portion 82 (refer to FIG. 4) and a notch portion 83 (refer to FIG. 4) described later.

<Knee Airbag Module>

Figure 2:
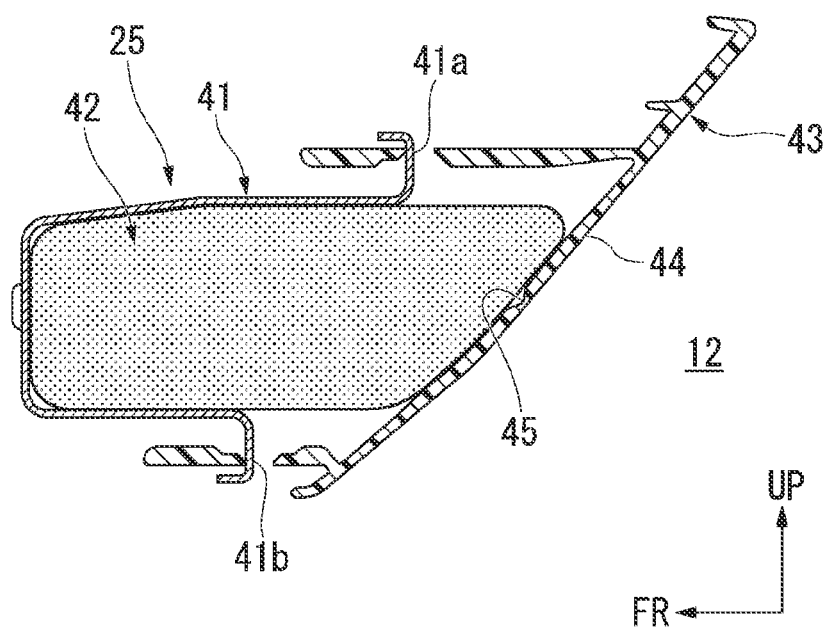
FIG. 2 is a cross-sectional view along a II-II line of FIG. 1.

FIG. 2 is a cross-sectional view along a II-II line of FIG. 1.

As shown in FIG. 1 and FIG. 2, the knee airbag module 25 is arranged between a lower left portion 36b of the center lower cover 36 and a lower outer portion 35a of the instrument panel lower main body 35 in the vehicle width direction. That is, the knee airbag module 25 is arranged on the instrument panel lower part 23.

The knee airbag module 25 is provided below a steering wheel 39 and at a vehicle body forward side of the vicinity of the knee of an occupant seated on a driver's seat (not shown).

The knee airbag module 25 includes an airbag case 41, a knee airbag main body 42, and an airbag cover 43. Hereinafter, the knee airbag main body 42 is referred to as an "airbag main body 42". The airbag case 41 is stored inside the instrument panel 21. The airbag case 41 is supported, for example, by an instrument panel reinforcement (not shown). The airbag main body 42 is stored inside the airbag case 41.

Further, the airbag cover 43 made of a resin is locked to an upper lock portion 41a and a lower lock portion 41b of the airbag case 41. The airbag cover 43 is arranged between the lower left portion 36b of the center lower cover 36 and the lower outer portion 35a of the instrument panel lower main body 35 in the vehicle width direction. Further, the airbag cover 43 is arranged such that an outer surface portion 44 is flush with respect to the instrument panel lower main body 35 and a cover main body 52 of the cover member 30.

A fracture portion 45 is formed on the outer surface portion 44 of the airbag cover 43 at a part that faces the airbag main body 42. In the airbag main body 42, an airbag bag body 46 (refer to FIG. 13B) is expanded, for example, due to a front collision. In the airbag cover 43, the fracture portion 45 is broken due to an expansion force (inflation force) of the airbag bag body 46, and the outer surface portion 44 opens. Thereby, the airbag bag body 46 is expanded from a cover opening portion 47 (refer to FIG. 13B) of the outer surface portion 44 to the vehicle room 12. It is possible to restrain the vicinity of the knee of the occupant by the expanded airbag bag body 46 and ensure the safety of the occupant.

<Cover Member>

Figure 3:
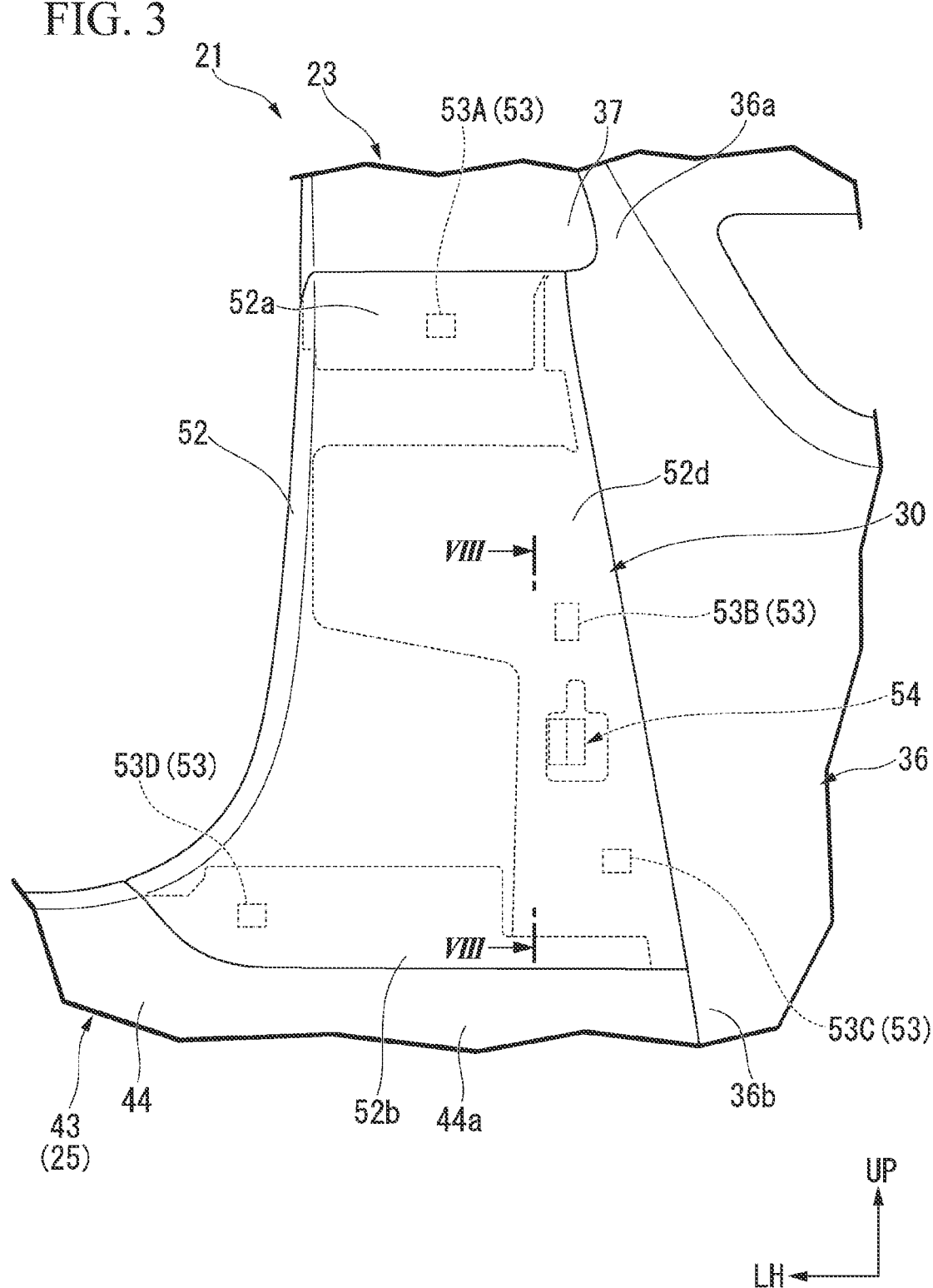
FIG. 3 is an enlarged view of a III portion of FIG. 1.
Figure 4:
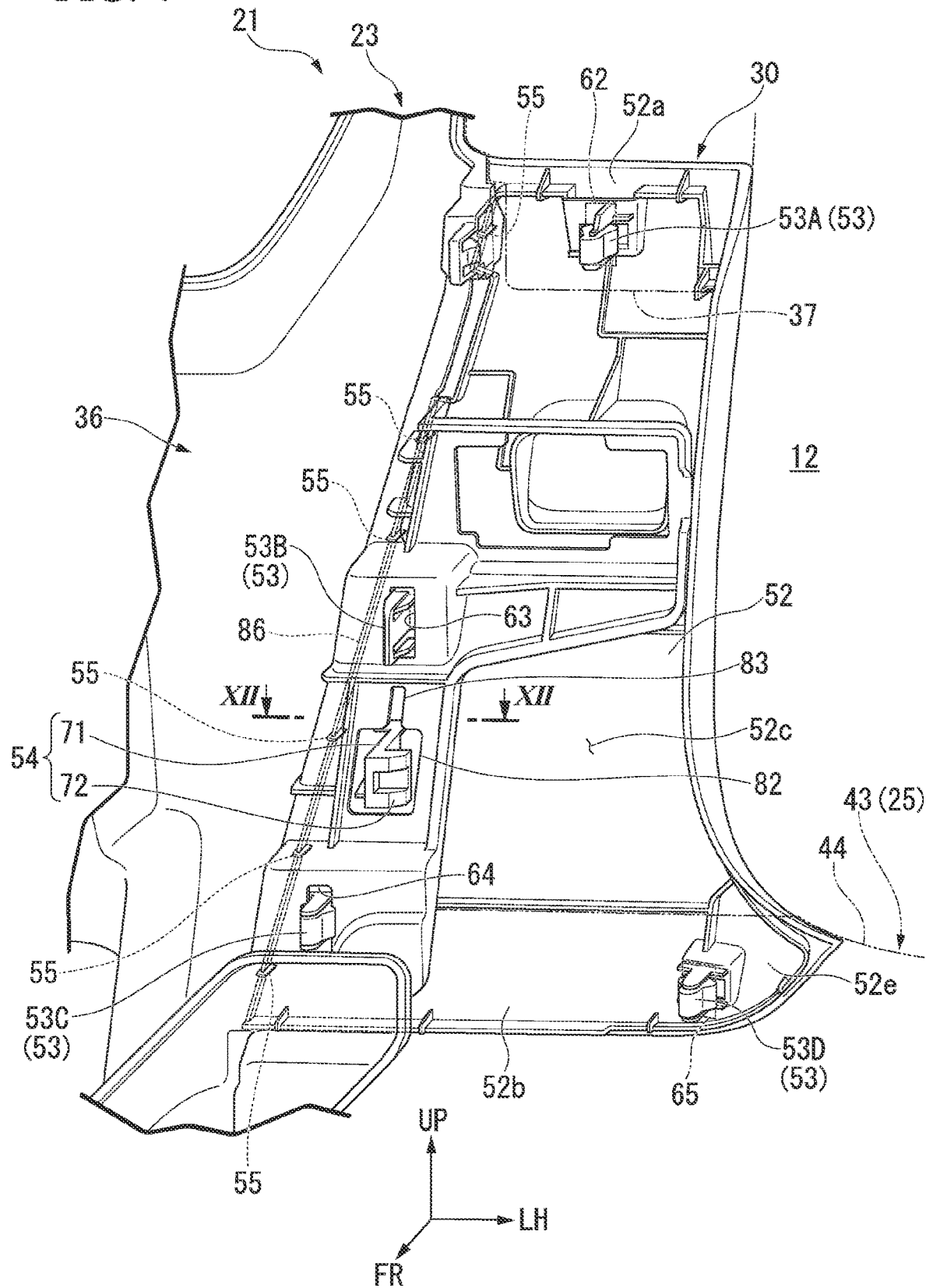
FIG. 4 is a perspective view of a center lower cover and a cover member according to the embodiment of the present invention when seen from a rear surface side.
Figure 5:
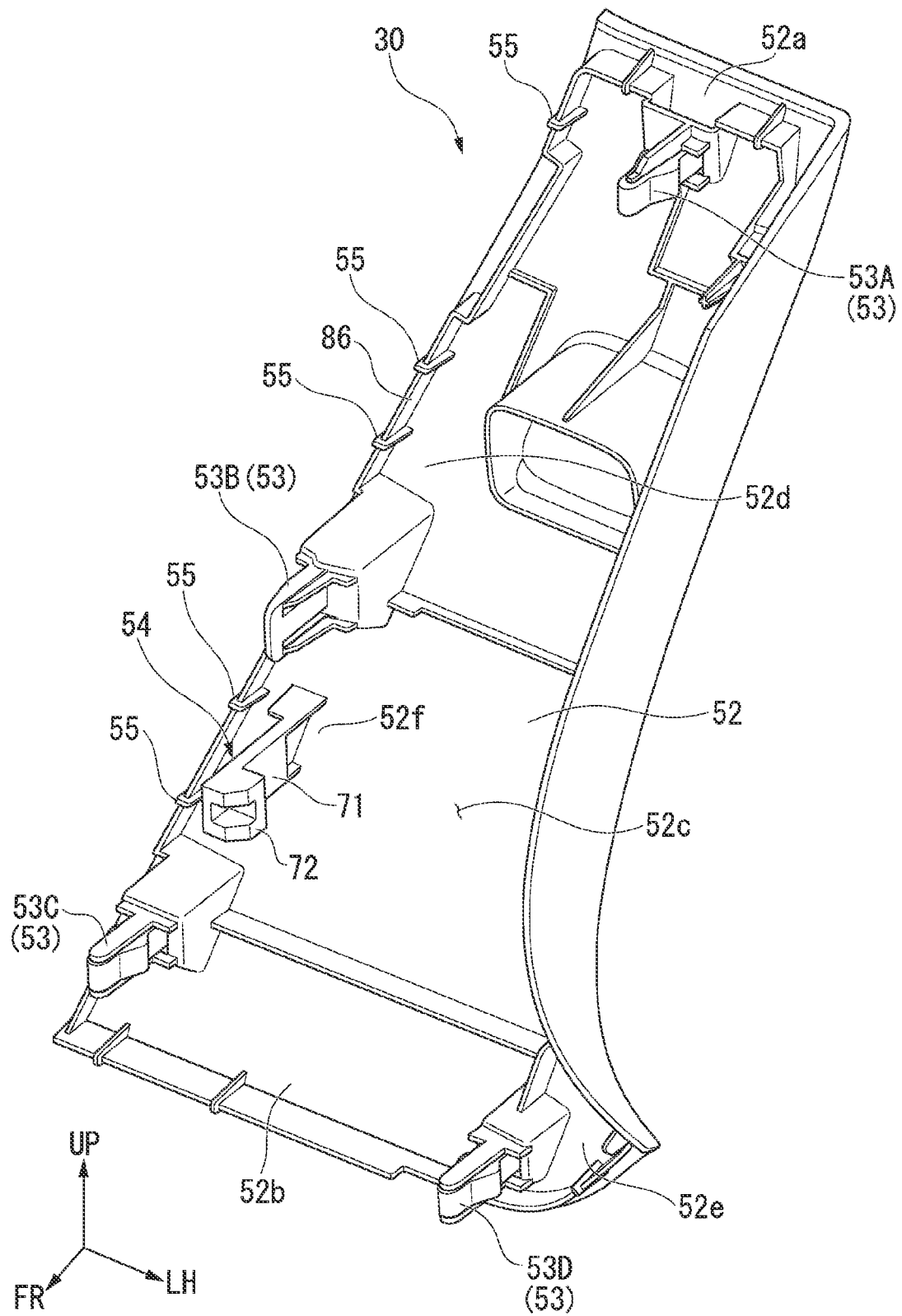
FIG. 5 is a perspective view of the cover member according to the embodiment of the present invention when seen from the rear surface side.

FIG. 3 is an enlarged view of a III portion of FIG. 1. FIG. 4 is a perspective view of the center lower cover 36 and the cover member 30 when seen from a rear surface side. FIG. 5 is a perspective view of the cover member 30 when seen from the rear surface side.

As shown in FIG. 3 to FIG. 5, the cover member 30 made of a resin is attached to the outer surface portion 44 of the airbag cover 43 between an inner end portion 44a and the meter visor 37 in an upward-downward direction. That is, the cover member 30 is arranged at an upper position relative to the outer surface portion 44 of the airbag cover 43 of the knee airbag module 25.

The cover member 30 is detachably attached to the instrument panel lower part 23, for example, such that a component such as the airbag main body 42 or the airbag case 41 of the knee airbag module 25 to be stored inside the instrument panel 21 can be attached to the cover member 30. The cover member 30 includes the cover main body 52, a plurality of claw portions 53 that are provided on the cover main body 52, and a plurality of regulation portions 55.

<Claw Portion>

The cover main body 52 is formed in a substantially trapezoidal shape in plan view and is arranged in a downward gradient in a vehicle body forward direction from an upper portion 52a toward a lower portion 52b. A plurality of claw portions 53 are provided on a rear surface (a rear surface of the cover member) 52c of the cover main body 52. Hereinafter, an example is described in which the plurality of claw portions 53 are, for example, four pieces of a first claw portion 53A, a second claw portion 53B, a third claw portion 53C, and a fourth claw portion 53D.

The embodiment is described using an example of the four pieces of the first claw portion 53A, the second claw portion 53B, the third claw portion 53C, and the fourth claw portion 53D as the plurality of claw portions 53. However, the embodiment is not limited thereto, and the number of the plurality of claw portions 53 is arbitrarily selectable.

The first claw portion 53A protrudes in the vehicle body forward direction from the rear surface 52c at a middle section in the vehicle width direction of the upper portion 52a of the cover main body 52. The first claw portion 53A is formed to be lockable to a first hole portion 62 of the meter visor 37 from the vehicle room 12 side.

Figure 6:
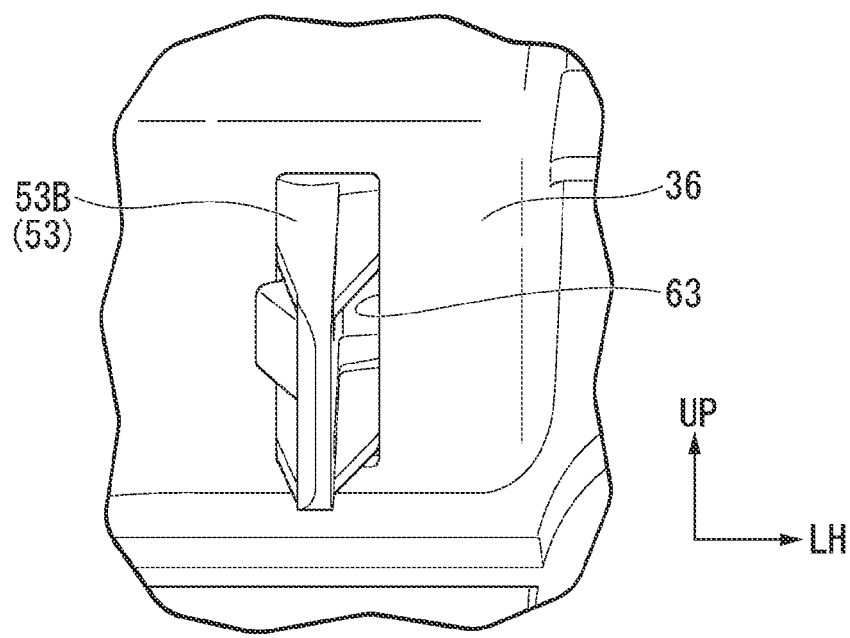
FIG. 6 is a perspective view showing a state in which a second claw portion is locked to a second hole portion according to the embodiment of the present invention.

FIG. 6 is a perspective view showing a state in which the second claw portion 53B is locked to a second hole portion 63.

As shown in FIG. 5 and FIG. 6, the second claw portion 53B protrudes in the vehicle body forward direction from the rear surface 52c at a middle portion in the upward-downward direction and at an inner side portion (a side portion of the cover member 30) 52d at the inside in the vehicle width direction of the cover main body 52. The second claw portion 53B is formed to be lockable to the second hole portion 63 of the center lower cover 36 from the vehicle room 12 (refer to FIG. 4) side.

Figure 7:
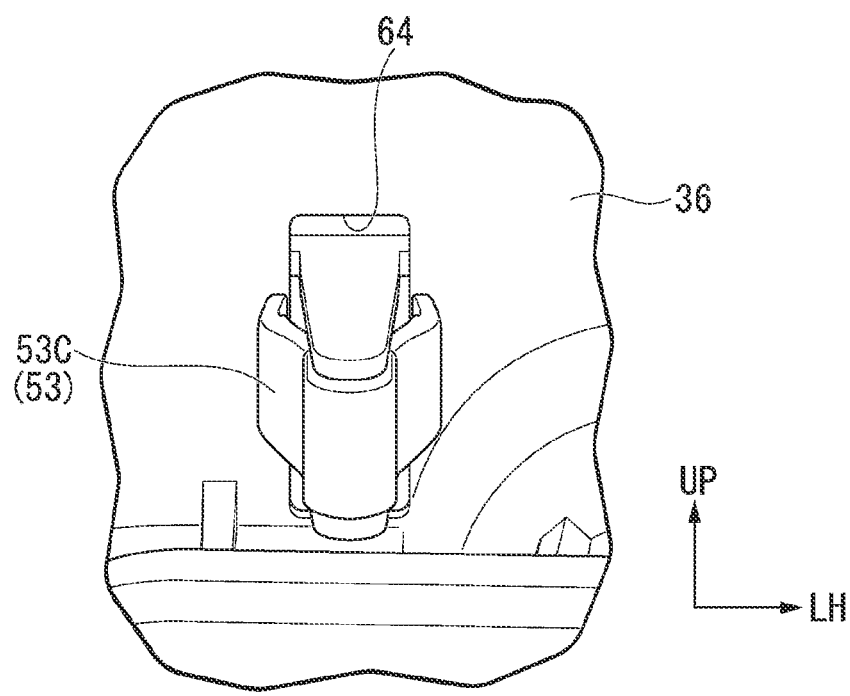
FIG. 7 is a perspective view showing a state in which a third claw portion is locked to a third hole portion according to the embodiment of the present invention.

FIG. 7 is a perspective view showing a state in which the third claw portion 53C is locked to a third hole portion 64.

As shown in FIG. 5 and FIG. 7, the third claw portion 53C protrudes in the vehicle body forward direction from the rear surface 52c at the lower portion 52b and at the inner side portion 52d of the cover main body 52. The third claw portion 53C is formed to be lockable to the third hole portion 64 of the center lower cover 36 from the vehicle room 12 (refer to FIG. 4) side.

As shown in FIG. 4 and FIG. 5, the fourth claw portion 53D protrudes in the vehicle body forward direction from the rear surface 52c at an outer side section 52e in the vehicle width direction of the lower portion 52b of the cover main body 52. The fourth claw portion 53D is formed to be lockable to a fourth hole portion 65 of the airbag cover 43 (specifically, the outer surface portion 44) from the vehicle room 12 side.

As shown in FIG. 3 and FIG. 4, the first claw portion 53A is locked to the first hole portion 62, and the second claw portion 53B is locked to the second hole portion 63. Further, the third claw portion 53C is locked to the third hole portion 64, and the fourth claw portion 53D is locked to the fourth hole portion 65. Thereby, the cover member 30 is detachably attached to the meter visor 37, the center lower cover 36, and the airbag cover 43.

The meter visor 37 and the center lower cover 36 are provided on the instrument panel lower part 23. Therefore, the cover member 30 is attached to the instrument panel lower part 23 by the first claw portion 53A, the second claw portion 53B, and the third claw portion 53C.

Here, the cover member 30 is arranged above the knee airbag module 25.

Therefore, it is conceivable that the first claw portion 53A to the fourth claw portion 53D are removed from the first hole portion 62 to the fourth hole portion 65 due to the expansion force when the airbag bag body 46 (refer to FIG. 13B) is expanded, and the cover member 30 moves upward. Accordingly, in order to prevent the cover member 30 from moving upward and being loosed, a holding part 54 is provided on the cover member 30, and the opening portion 82 and the notch portion 83 are provided on the center lower cover 36.

Hereinafter, the holding part 54, the opening portion 82, and the notch portion 83 are described in detail.
<Holding Part>

As shown in FIG. 4 and FIG. 5, the holding part 54 is provided on the rear surface 52c of the inner side portion 52d of the cover main body 52. The holding part 54 is provided on the rear surface 52c at a middle section 52f between the second claw portion 53B and the third claw portion 53C of the inner side portion 52d of the cover main body 52.

That is, the first claw portion 53A and the second claw portion 53B are provided above the holding part 54. Further, the third claw portion 53C and the fourth claw portion 53D are provided below the holding part 54.

The reason for providing the first claw portion 53A and the second claw portion 53B above the holding part 54 and providing the third claw portion 53C and the fourth claw portion 53D below the holding part 54 is described later in detail.

Figure 8:
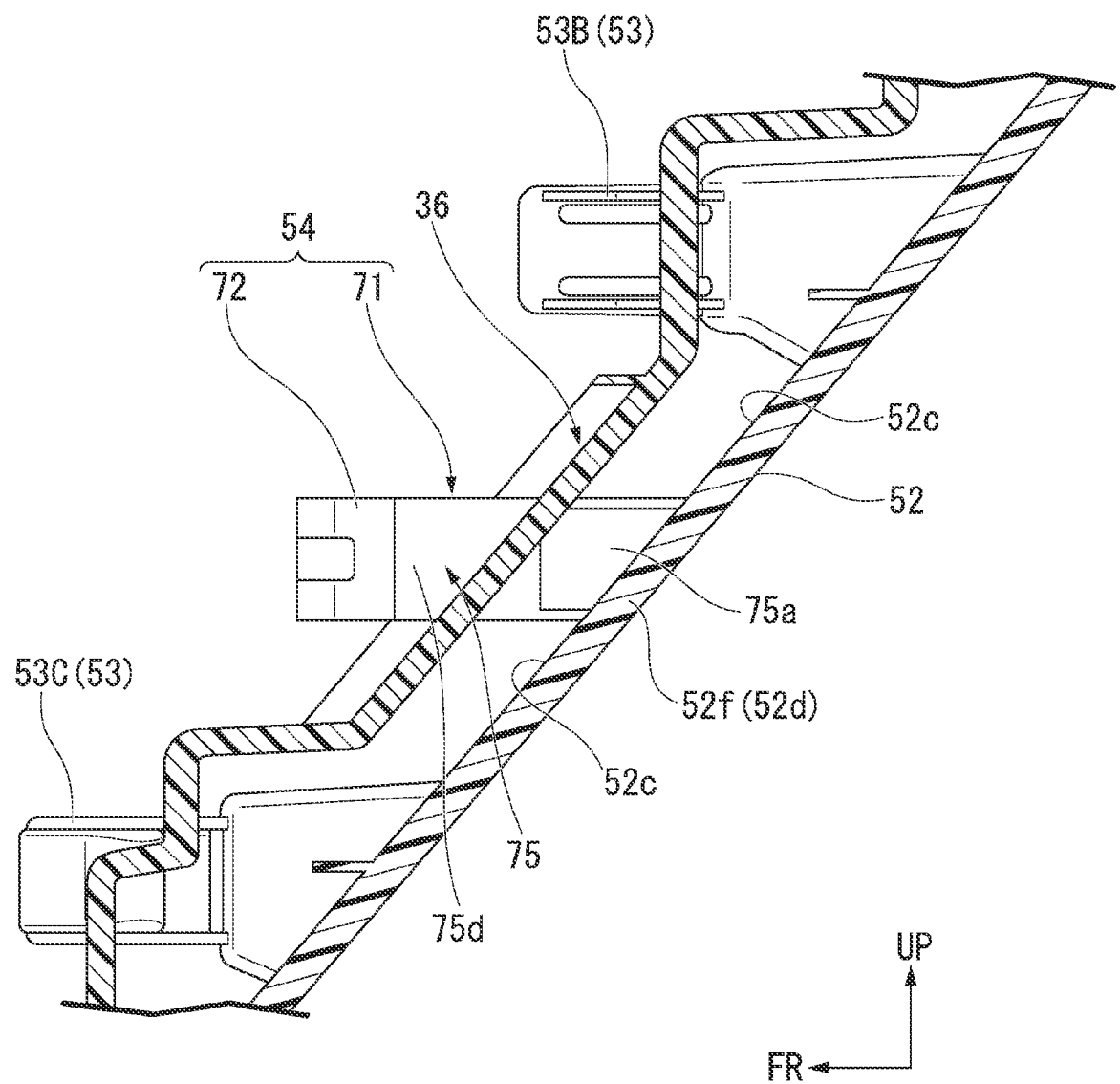
FIG. 8 is a cross-sectional view along a VIII-VIII line of FIG. 3.
Figure 9:
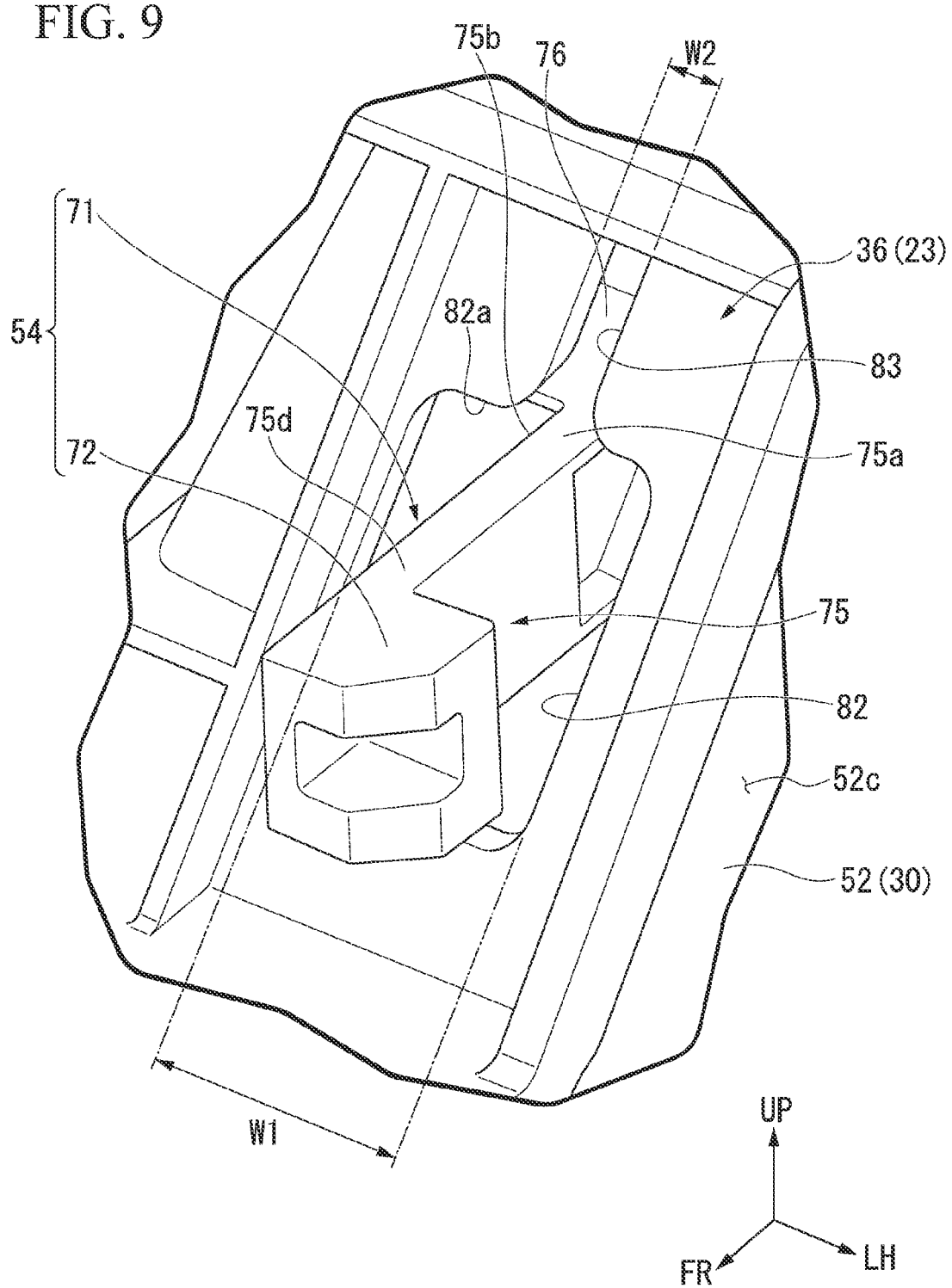
FIG. 9 is a perspective view showing a state in which a holding part is inserted into an opening portion according to the embodiment of the present invention.
Figure 10:
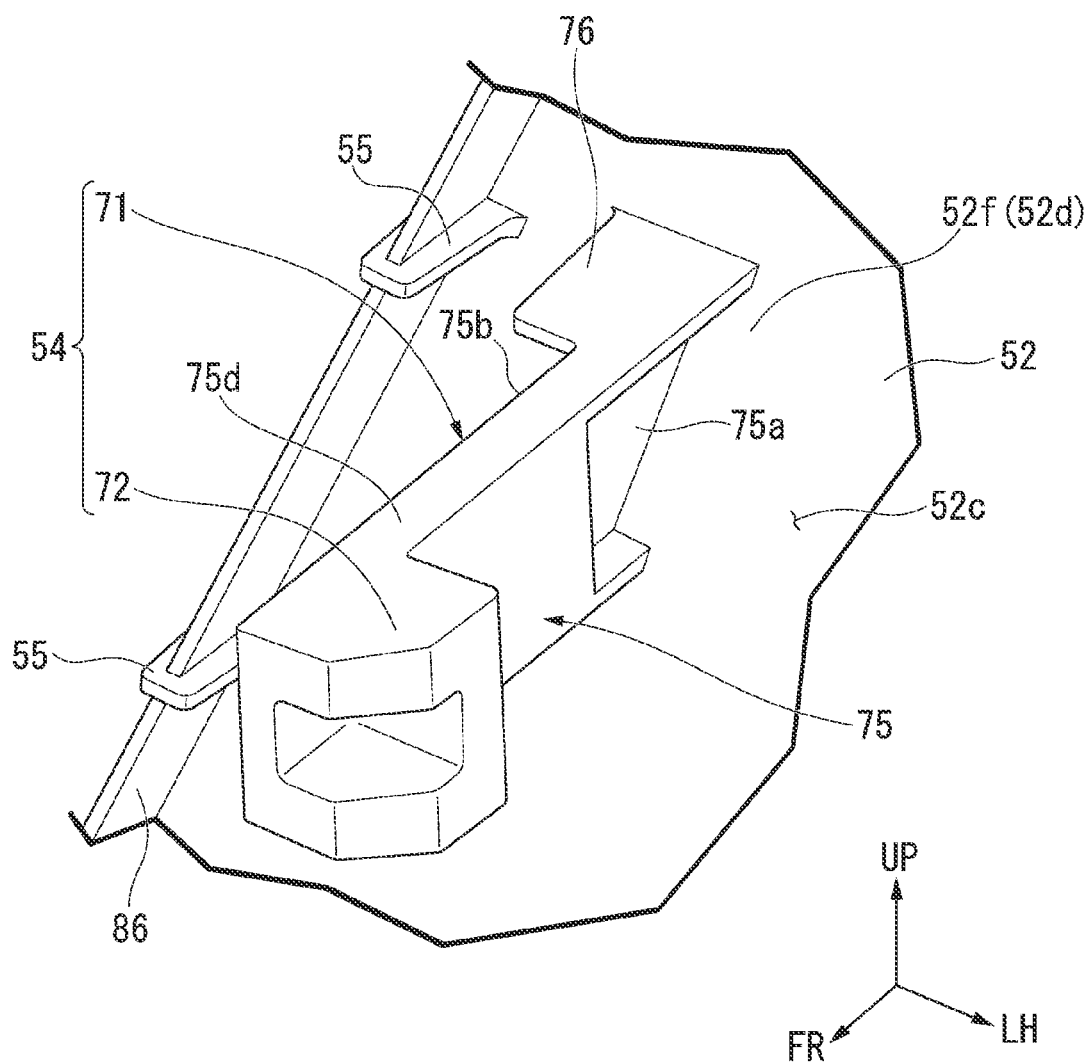
FIG. 10 is a perspective view showing the holding part according to the embodiment of the present invention.
Figure 11:
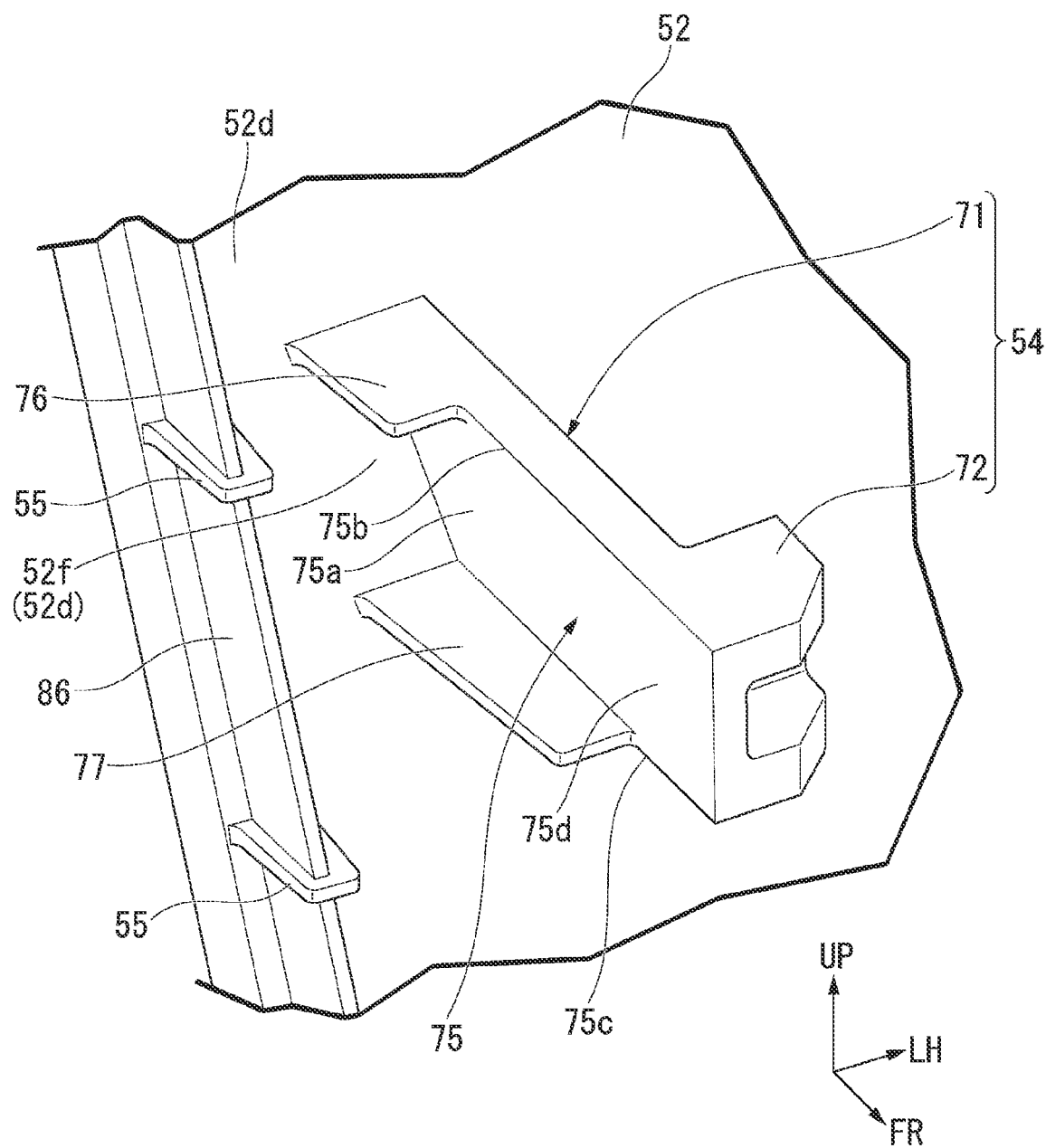
FIG. 11 is a perspective view of the holding part when seen from an opposite side of a direction in which a lock portion protrudes according to the embodiment of the present invention.

FIG. 8 is a cross-sectional view along a VIII-VIII line of FIG. 3. FIG. 9 is a perspective view showing a state in which the holding part 54 is inserted into the opening portion 82. FIG. 10 is a perspective view of the holding part 54. FIG. 11 is a perspective view of the holding part 54 when seen from an opposite side of a direction in which a lock portion 72 protrudes.

As shown in FIG. 8 to FIG. 11, the holding part 54 includes a main body portion 71 and the lock portion 72 that is provided on the main body portion 71. The main body portion 71 extends in the vehicle body forward direction from the rear surface 52c at the middle section 52f of the cover main body 52. The main body portion 71 includes a leg section 75, a first support section (support section) 76 that is provided on the leg section 75, and a second support section (support section) 77 that is provided on the leg section 75.

The leg section 75 extends in the vehicle body forward direction from the rear surface 52c at the middle section 52f of the cover main body 52. The leg section 75 is formed, for example, such that a base end 75a is inclined along the rear surface 52c of the middle section 52f. By providing the base end 75a along the rear surface 52c of the middle section 52f, the leg section 75 extends in the vehicle body forward direction from the rear surface 52c of the middle section 52f. The first support section 76 and the second support section 77 are provided on the base end 75a of the leg section 75.

The first support section 76 extends inward in the vehicle width direction from an upper side 75b at the base end 75a of the leg section 75 and is provided integrally on the middle section 52f of the cover main body 52. The second support section 77 extends inward in the vehicle width direction from a lower side 75c at the base end 75a of the leg section 75 and is provided integrally on the middle section 52f at a middle portion in the upward-downward direction of the cover main body 52. Therefore, the leg section 75 is reinforced by the first support section 76 and the second support section 77. Further, the lock portion 72 is provided integrally on a front end 75d of the leg section 75.

The lock portion 72 protrudes outward in the vehicle width direction from the front end 75d of the leg section 75. That is, the lock portion 72 protrudes in an opposite direction with respect to extension directions of the first support section 76 and the second support section 77. In other words, the first support section 76 and the second support section 77 extend in an opposite direction with respect to a protrusion direction of the lock portion 72.

The reason why the first support section 76 and the second support section 77 extend in the opposite direction with respect to the protrusion direction of the lock portion 72 is described later in detail.

The holding part 54 formed in this way is arranged at a position corresponding to the opening portion 82 and the notch portion 83 of the center lower cover 36 in a state where the cover member 30 is attached to the instrument panel lower part 23.
<Opening Portion, Notch Portion>

As shown in FIG. 4 and FIG. 9, the center lower cover 36 includes the opening portion 82 and the notch portion 83 that are formed at a position corresponding to the holding part 54. The opening portion 82 and the notch portion 83 are formed between the second hole portion 63 and the third hole portion 64 in the upward-downward direction. The opening portion 82 is formed in a rectangular shape, for example, such that the leg section 75, the first support section 76, the second support section 77, and the lock portion 72 of the holding part 54 can be inserted in the opening portion 82. That is, the opening portion 82 is formed such that the main body portion 71 and the lock portion 72 can be inserted in the opening portion 82 when the cover member 30 is attached to the instrument panel lower part 23 (specifically, the meter visor 37, the center lower cover 36) or the airbag cover 43. The notch portion 83 extends upward from the opening portion 82.

The notch portion 83 extends upward from a middle section in the vehicle width direction at an upper side 82a of the opening portion 82. The notch portion 83 is formed such that a notch width W2 is narrower than an opening width W1 of the opening portion 82. Specifically, the notch width W2 is formed so as to allow the leg section 75 to enter the notch portion 83 from the opening portion 82 and to prevent the lock portion 72 from exiting from the notch portion 83 to the vehicle room 12 side in a state where the leg section 75 enters the opening portion 82.
<Regulation Portion>

Figure 12:
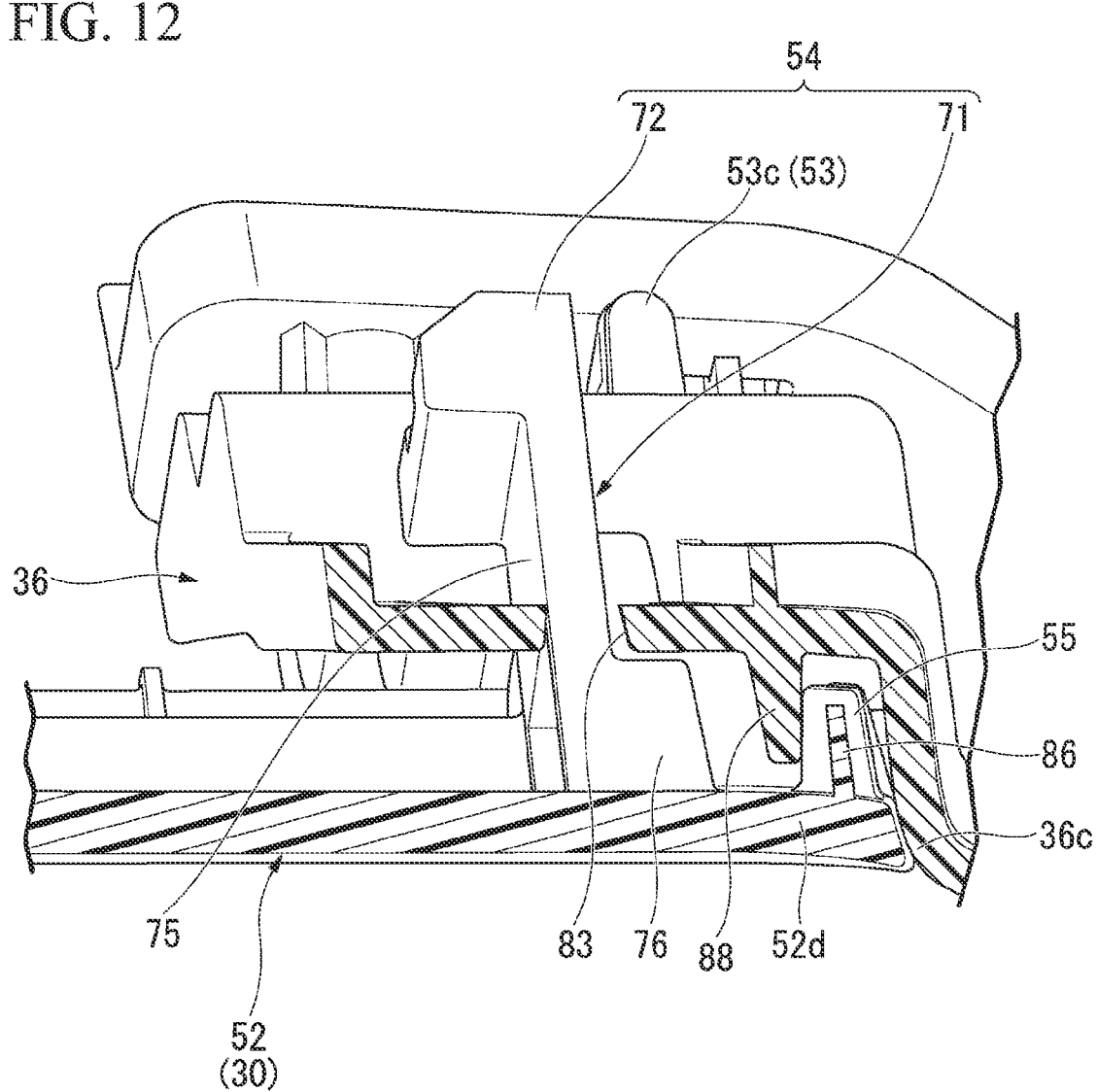
FIG. 12 is a cross-sectional view along a XII-XII line of FIG. 4.

FIG. 12 is a cross-sectional view along a XII-XII line of FIG. 4.

As shown in FIG. 4, FIG. 5, and FIG. 12, the plurality of regulation portions 55 are provided on the cover main body 52 of the cover member 30. Specifically, in the cover main body 52, a cover rib 86 extends in the vehicle body forward direction from the inner side portion 52d at the inside in the vehicle width direction. The cover rib 86 is located at an inner position in the vehicle width direction relative to the second claw portion 53B, the third claw portion 53C, and the holding part 54.

The plurality of regulation portions 55 is formed in a U shape so as to straddle the cover rib 86. Further, the plurality of regulation portions 55 are arranged to be spaced in the upward-downward direction between the upper portion 52a and the lower portion 52b of the cover main body 52. The plurality of regulation portions 55 are formed integrally on the cover rib 86 and the inner side portion 52d of and the cover main body 52.

That is, the plurality of regulation portions 55 are provided on the inner side portion 52d of the cover main body 52 and at the inside in the vehicle width direction relative to the holding part 54. Further, the plurality of regulation portions 55 are formed to be capable of coming into contact with a lower cover rib 88 of the center lower cover 36 at the outside in the vehicle width direction. That is, the lower cover rib 88 of the center lower cover 36 is provided at the outside in the vehicle width direction relative to the plurality of regulation portions 55.

Here, the first claw portion 53A to the fourth claw portion 53D are removed from the first hole portion 62 to the fourth hole portion 65 due to the expansion force of the airbag bag body 46 (refer to FIG. 13B), and the cover member 30 moves upward. At this time, the plurality of regulation portions 55 and the lower cover rib 88 can prevent the cover member 30 from moving outward in the vehicle width direction.

Further, the inner side portion 52d of the cover main body 52 is in contact with a bent portion 36c of the center lower cover 36. Therefore, when the cover member 30 moves upward due to the expansion force of the airbag bag body 46, the inner side portion 52d and the bent portion 36c can prevent the cover member 30 from moving inward in the vehicle width direction.

The embodiment is described using an example in which the inner side portion 52d of the cover main body 52 comes into contact with the bent portion 36c of the center lower cover 36 and prevents the cover member 30 from moving inward in the vehicle width direction. However, the embodiment is not limited thereto, and as another example, a lower cover rib may be further formed on the center lower cover 36, and the formed lower cover rib may be arranged at the inside in the vehicle width direction relative to the plurality of regulation portions 55. By causing the plurality of regulation portions 55 to come into contact with the lower cover rib, it is possible to prevent the cover member 30 from moving inward in the vehicle width direction.

<Operation Explanation of Instrument Panel Structure>

Next, an operation of the instrument panel structure 20 is described with reference to FIG. 13A to FIG. 15.

Figure 13A:
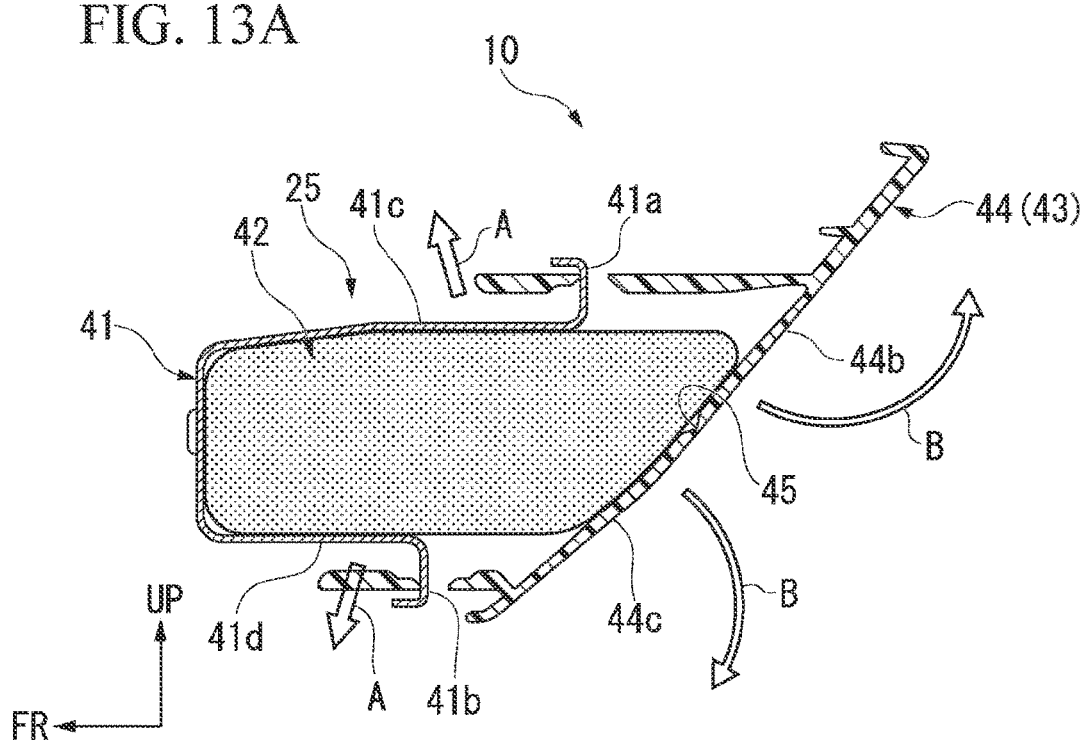
FIG. 13A shows a knee airbag module according to the embodiment of the present invention and is a cross-sectional view showing an example in which an airbag bag body is expanded.
Figure 13B:
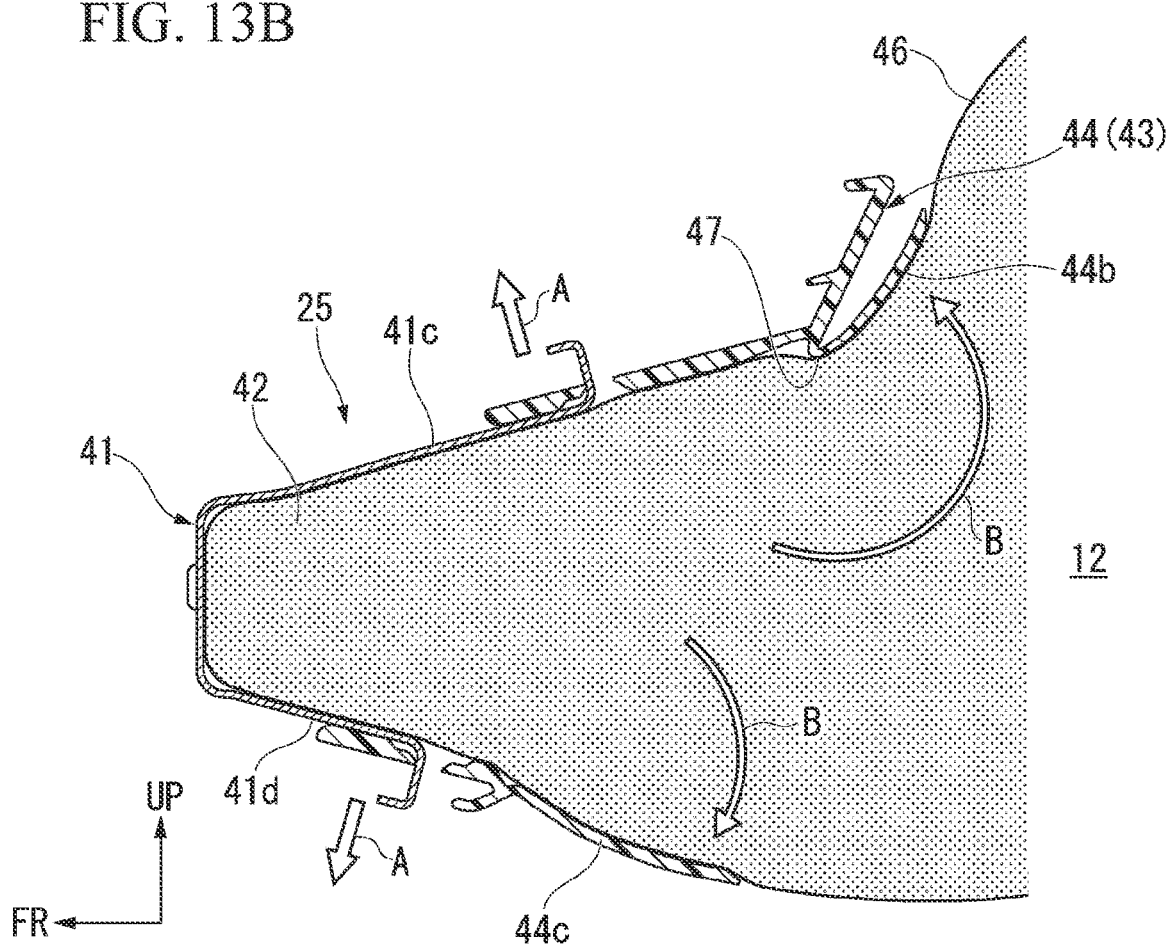
FIG. 13B shows the knee airbag module according to the embodiment of the present invention and is a cross-sectional view showing an example in which the airbag bag body is expanded and restrains the vicinity of the knee of an occupant.
Figure 14:
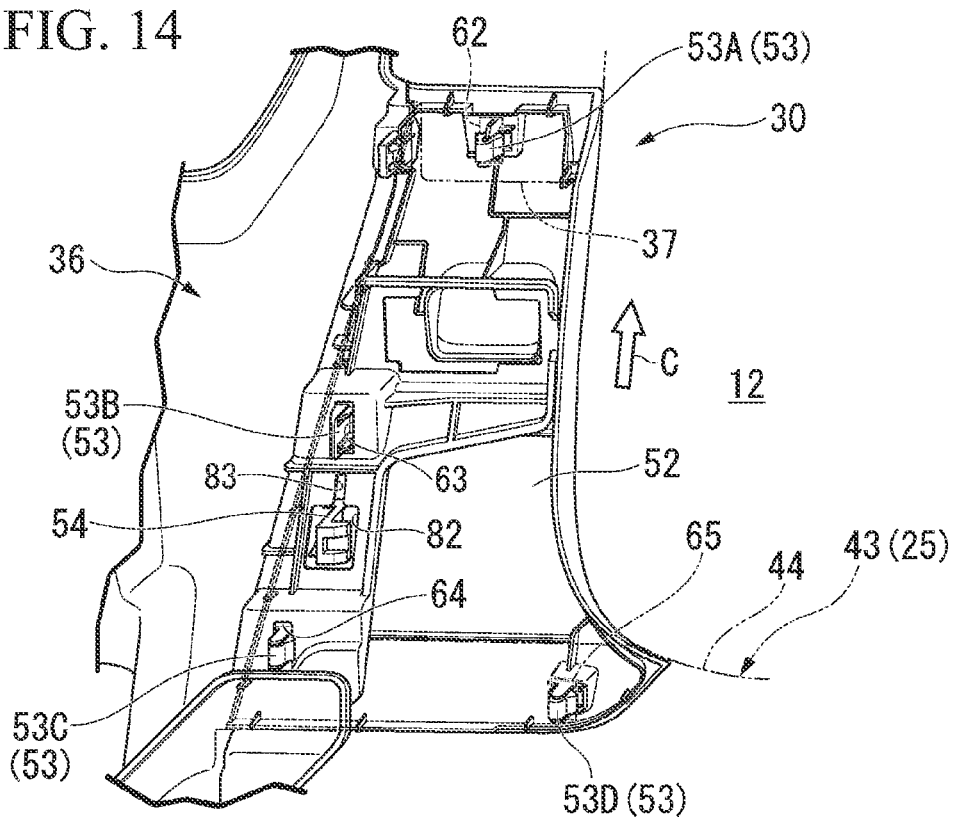
FIG. 14 is a perspective view showing an example in which the cover member moves upward by an expansion force of the airbag bag body according to the embodiment of the present invention.
Figure 15:
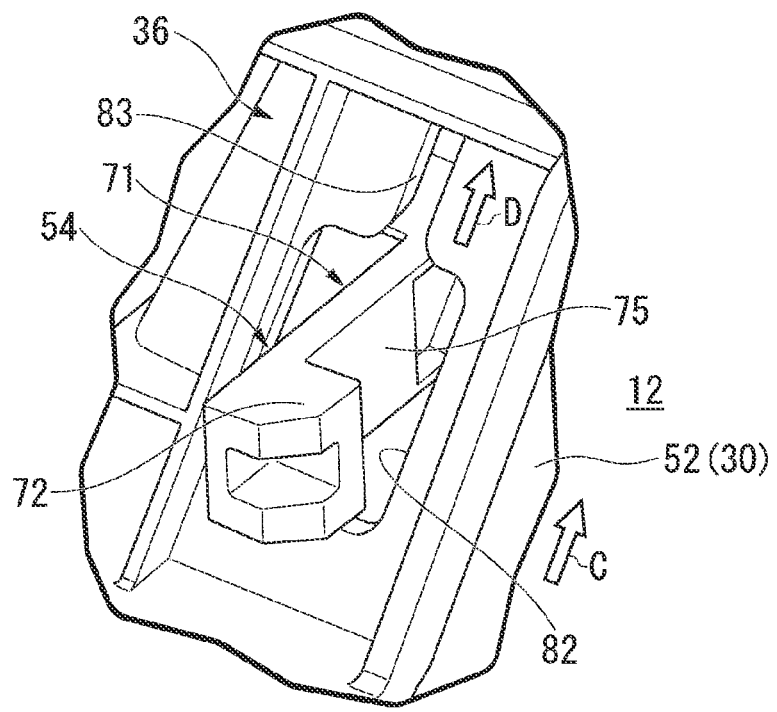
FIG. 15 is a perspective view showing an example in which a leg section of the holding part enters a notch portion and prevents the cover member from being loosed according to the embodiment of the present invention.

FIGS. 13A and 13B show the knee airbag module 25. FIG. 13A is a cross-sectional view showing an example in which the airbag bag body 46 is expanded. FIG. 13B is a cross-sectional view showing an example in which the airbag bag body 46 is expanded and restrains the vicinity of the knee of an occupant. FIG. 14 is a perspective view showing an example in which the cover member 30 moves upward by an expansion force of the airbag bag body 46. FIG. 15 is a perspective view showing an example in which the leg section 75 of the holding part 54 enters the notch portion 83 and prevents the cover member 30 from being loosed.

As shown in FIG. 13A, for example, the airbag bag body 46 (refer to FIG. 13B) of the airbag main body 42 is expanded due to a front collision of the vehicle 10 (refer to FIG. 1). When the airbag bag body 46 is expanded, the upper case portion 41c and the lower case portion 41d of the airbag case 41 spread in the upward-downward direction as indicated by an arrow A due to the expansion force of the airbag bag body 46.

Further, when the airbag bag body 46 is expanded, the fracture portion 45 of the airbag cover 43 (specifically, the outer surface portion 44) is broken due to the expansion force of the airbag bag body 46. The fracture portion 45 is broken, and thereby, the upper cover portion 44b and the lower cover portion 44c of the outer surface portion 44 are opened in the upward-downward direction as indicated by an arrow B.

As shown in FIG. 13B, the upper cover portion 44b and the lower cover portion 44c are opened, and thereby, the cover opening portion 47 is opened at the outer surface portion 44. Here, the upper case portion 41c and the lower case portion 41d spread in the upward-downward direction as indicated by the arrow A, and thereby, the upper cover portion 44b and the lower cover portion 44c are spread in the upward-downward direction. Thereby, the cover opening portion 47 is widely spread in the upward-downward direction.

In this state, the airbag bag body 46 is expanded to the vehicle room 12 from the widely spread cover opening portion 47 and restrains the vicinity of the knee of the occupant, and it is possible to ensure the safety of the occupant.

As shown in FIG. 13B and FIG. 14, the cover member 30 is arranged above the knee airbag module 25. Here, when the upper case portion 41c spreads upward as indicated by the arrow A due to the expansion force of the airbag bag body 46, the upper cover portion 44b is spread upward. Therefore, it is conceivable that due to the expansion force of the airbag bag body 46, the first claw portion 53A to the fourth claw portion 53D of the cover member 30 are removed from the first hole portion 62 to the fourth hole portion 65.

In a case where the first claw portion 53A to the fourth claw portion 53D are removed from the first hole portion 62 to the fourth hole portion 65, the cover member 30 moves upward as indicated by an arrow C due to the expansion force of the airbag bag body 46.

As shown in FIG. 14 and FIG. 15, the cover member 30 moves upward as indicated by the arrow C, and thereby, the leg section 75 of the holding part 54 enters the notch portion 83 from the opening portion 82 as indicated by an arrow D. In a state where the leg section 75 enters the notch portion 83, the lock portion 72 of the holding part 54 is arranged at a position that faces the notch portion 83 at the vehicle body forward side.

In this state, the lock portion 72 can be held by the center lower cover 36 so as to prevent the lock portion 72 from exiting to the vehicle room 12 side from the notch portion 83. Thereby, it is possible to prevent the cover member 30 from moving to the vehicle room 12 side and being loosed.

As described above, in the instrument panel structure 20 of the embodiment, as shown in FIG. 1, FIG. 4, and FIG. 9, the cover member 30 includes the main body portion 71 and the lock portion 72 as the holding part 54. Further, the center lower cover 36 includes the opening portion 82. The opening portion 82 is formed such that the main body portion 71 and the lock portion 72 are inserted in the opening portion 82. Therefore, by inserting the main body portion 71 and the lock portion 72 into the opening portion 82, the cover member 30 can be attached to the instrument panel lower part 23 (specifically, the meter visor 37, the center lower cover 36) and the outer surface portion 44 of the airbag cover 43.

Further, the notch portion 83 is provided on the center lower cover 36, and the notch portion 83 extends upward from the opening portion 82. The notch portion 83 is formed so as to allow entry of the main body portion 71 (specifically, the leg section 75) and prevent the lock portion 72 from exiting in a state where the leg section 75 enters the notch portion 83. Therefore, when the cover member 30 moves upward due to an expansion force of the airbag bag body 46 (refer to FIG. 13B), the leg section 75 can enter (be inserted into) the notch portion 83 in accordance with the movement of the cover member 30. In this state, the notch portion 83 (that is, the center lower cover 36) prevents the lock portion 72 from exiting to the vehicle room 12 side, and thereby, it is possible to prevent the cover member 30 from being loosed to the vehicle room 12 side.

Thereby, for example, it is possible to prevent the cover member 30 from being loosed at the time of expansion of the airbag bag body 46 without mechanically fastening the cover member 30 to the instrument panel lower part 23 by a fastening member such as a bolt. Accordingly, it is possible to make the fastening member such as a bolt unnecessary, and it is possible to reduce the number of components, reduce the cost, and reduce the weight.

Further, it is possible to make portions in the instrument panel lower part 23 and the cover member 30 that are fastened by the fastening member unnecessary, and it is possible prevent the size of the component from increasing. Further, it is possible to make a step of fastening the cover member 30 to the instrument panel lower part 23 by the fastening member unnecessary, and it is possible to simplify the assembly workability.

Further, as shown in FIG. 4 and FIG. 9, the cover member 30 includes the first claw portion 53A to the fourth claw portion 53D, the first claw portion 53A and the second claw portion 53B are provided above the holding part 54, and the third claw portion 53C and the fourth claw portion 53D are provided below the holding part 54. Further, the cover member 30 is attached to the instrument panel lower part 23 (specifically, the meter visor 37, the center lower cover 36) and the outer surface portion 44 of the airbag cover 43 by the first claw portion 53A to the fourth claw portion 53D.

Therefore, for example, when the cover member 30 moves upward due to the expansion force of the airbag (refer to FIG. 13B), it is possible to prevent the cover member 30 (that is, the leg section 75) from moving in the vehicle width direction by the first claw portion 53A to the fourth claw portion 53D. Thereby, it is possible to cause the leg section 75 to favorably enter the notch portion 83 in accordance with an upward movement of the cover member 30.

Further, as shown in FIG. 4, FIG. 5, and FIG. 12, the plurality of regulation portions 55 are provided on the cover member 30, and the plurality of regulation portions 55 are formed to be capable of coming into contact with the lower cover rib 88 of the center lower cover 36 at the outside in the vehicle width direction. Therefore, when the cover member 30 moves upward due to the expansion force of the airbag bag body 46, by causing the plurality of regulation portions 55 to come into contact with the lower cover rib 88 of the center lower cover 36, it is possible to prevent the cover member 30 (that is, the leg section 75) from moving outward in the vehicle width direction. Thereby, it is possible to cause the leg section 75 to favorably enter the notch portion 83 in accordance with the movement of the cover member 30.

Further, the inner side portion 52d of the cover main body 52 is in contact with the bent portion 36c of the center lower cover 36. Therefore, when the first claw portion 53A to the fourth claw portion 53D are removed from the first hole portion 62 to the fourth hole portion 65 due to the expansion force of the airbag bag body 46, and the cover member 30 moves upward, the inner side portion 52d and the bent portion 36c can prevent the cover member 30 from moving inward in the vehicle width direction. Thereby, it is possible to cause the leg section 75 to further favorably enter the notch portion 83 in accordance with the movement of the cover member 30.

Additionally, as shown in FIG. 9 to FIG. 11, in a state where the cover member 30 moves upward due to the expansion force of the airbag bag body 46 (refer to FIG. 13B), and the leg section 75 enters the notch portion 83, the lock portion 72 comes into contact with the center lower cover 36 and prevents the cover member 30 from being loosed. At this time, it is conceivable that a tensile force due to the expansion force of the airbag bag body 46 acts on the leg section 75, a stress concentrates on a connection portion between the leg section 75 and the inner side portion 52d (specifically, the middle section 52f) of the cover main body 52, and a crack or the like is generated at the connection portion. Therefore, there is a possibility that the leg section 75 and lock portion 72 cannot hold the cover member 30 to the center lower cover 36.

Therefore, the leg section 75 includes the first support section 76 and the second support section 77, and the first support section 76 and the second support section 77 are provided on the middle section 52f of the cover main body 52. Therefore, the connection portion between the leg section 75 and the middle section 52f of the cover main body 52 can be reinforced by the first support section 76 and the second support section 77. Thereby, when the tensile force due to the expansion force of the airbag bag body 46 acts on the leg section 75, the first support section 76 and the second support section 77 can prevent the stress from concentrating on the connection portion between the leg section 75 and the middle section 52f of the cover main body 52.

That is, it is possible to prevent a crack or the like from being generated at the connection portion between the leg section 75 and the middle section 52f of the cover main body 52. Accordingly, the holding part 54 that is constituted of the leg section 75, the first support section 76, the second support section 77, and the lock portion 72 can hold the cover member 30 such that the cover member 30 is not loosed from the center lower cover 36 (that is, the instrument panel lower part 23).

Here, in a state where the lock portion 72 is in contact with the center lower cover 36, the expansion force of the airbag (refer to FIG. 13B) acts on the lock portion 72. In this state, it is conceivable that the leg section 75 deforms in a curved shape to an opposite side with respect to a protrusion direction of the lock portion 72 due to the expansion force of the airbag bag body 46.

Therefore, the first support section 76 and the second support section 77 extend in the opposite direction with respect to the protrusion direction of the lock portion 72. Therefore, when the tensile force due to the expansion force of the airbag bag body 46 acts on the leg section 75, the first support section 76 and the second support section 77 can further efficiently prevent the stress from concentrating on the connection portion between the leg section 75 and the middle section 52f of the cover member. That is, it is possible to further favorably prevent a crack or the like from being generated at the connection portion between the leg section 75 and the middle section 52f of the cover main body 52. Thereby, the cover member 30 can be further favorably held by the holding part 54 such that the cover member 30 is not loosed from the center lower cover 36 (that is, the instrument panel lower part 23).

The technical scope of the present invention is not limited to the embodiment described above, and various modifications can be added without departing from the scope of the present invention.

The component in the above embodiment can be appropriately replaced by a well-known component without departing from the scope of the present invention, and modification examples described above can be suitably combined.

What is claimed is:

1. An instrument panel structure with a knee airbag, comprising:
   a knee airbag that is arranged on an instrument panel lower part; and
   a cover member that is arranged above the knee airbag and is attached to the instrument panel lower part,
   wherein the cover member comprises:
      a main body portion that extends in a vehicle body forward direction from a rear surface of the cover member; and
      a lock portion that is provided on a front end of the main body portion and protrudes in a vehicle width direction from the front end of the main body portion,
   and wherein the instrument panel lower part comprises:
      an opening portion in which the main body portion and the lock portion are inserted; and
      a notch portion that extends upward from an upper side of the opening portion and has a notch width formed to be narrower than an opening width of the opening portion and a length in the vehicle width direction of the lock portion,
      the notch portion being formed so as to allow entry of the main body portion and prevent the lock portion from exiting in a state where the main body portion enters the notch portion, and
      in a state where the cover member is attached to the instrument panel lower part, the main body portion and the lock portion are in a state of being inserted in the opening portion and are located below the notch portion.

2. The instrument panel structure with a knee airbag according to claim 1,
   wherein the cover member comprises a plurality of claw portions that are provided above and below the main body portion, and
   the cover member is attached to the instrument panel lower part by the plurality of claw portions.

3. The instrument panel structure with a knee airbag according to claim 2,
   wherein the main body portion comprises a support section that is provided on the rear surface of the cover member and extends in an opposite direction with respect to a protrusion direction of the lock portion.

4. The instrument panel structure with a knee airbag according to claim 2,
   wherein the cover member comprises a regulation portion that is provided on a side portion of the cover member and on an inside in the vehicle width direction of the main body portion, and
   the regulation portion is formed to be capable of coming into contact with the instrument panel lower part in the vehicle width direction.

5. The instrument panel structure with a knee airbag according to claim 4,
   wherein the main body portion comprises a support section that is provided on the rear surface of the cover member and extends in an opposite direction with respect to a protrusion direction of the lock portion.

6. The instrument panel structure with a knee airbag according to claim 2,
   wherein the plurality of claw portions protrude in a vehicle body forward direction from a vehicle room side of the cover member and have a length in a vehicle body upward-downward direction that is longer than a length in a vehicle body width direction.

7. The instrument panel structure with a knee airbag according to claim 6,
   wherein the cover member comprises a regulation portion that is provided on a side portion of the cover member and on an inside in the vehicle width direction of the main body portion, and
   the regulation portion is formed to be capable of coming into contact with the instrument panel lower part in the vehicle width direction.

8. The instrument panel structure with a knee airbag according to claim 6,
   wherein the main body portion comprises a support section that is provided on the rear surface of the cover member and extends in an opposite direction with respect to a protrusion direction of the lock portion.

9. The instrument panel structure with a knee airbag according to claim 1,
   wherein the cover member comprises a regulation portion that is provided on a side portion of the cover member and on an inside in the vehicle width direction of the main body portion, and
   the regulation portion is formed to be capable of coming into contact with the instrument panel lower part in the vehicle width direction.

10. The instrument panel structure with a knee airbag according to claim 9,
    wherein the main body portion comprises a support section that is provided on the rear surface of the cover member and extends in an opposite direction with respect to a protrusion direction of the lock portion.

11. The instrument panel structure with a knee airbag according to claim 1,
    wherein the main body portion comprises a support section that is provided on the rear surface of the cover member and extends in an opposite direction with respect to a protrusion direction of the lock portion.

* * * * *